United States Patent
Hinterwäller et al.

[11] Patent Number: 6,155,492
[45] Date of Patent: Dec. 5, 2000

[54] DEVICE AND METHOD FOR CONTROLLING THE INTERIOR TEMPERATURE OF A MOTOR VEHICLE

[75] Inventors: Dieter Hinterwäller, Mainz; Jörg Jung, Pohlheim, both of Germany

[73] Assignee: Mannesmann VDO AG, Germany

[21] Appl. No.: 09/400,352

[22] Filed: Sep. 20, 1999

[30] Foreign Application Priority Data

Sep. 18, 1998 [DE] Germany .................. 198 42 895

[51] Int. Cl.$^7$ .................................. G05D 23/27
[52] U.S. Cl. .............................. 236/51; 454/75
[58] Field of Search ............... 236/51, 49.3, 91 R, 236/91 C, 91 D, 91 E; 374/121; 165/202, 203, 204, 42, 43; 62/244, 239; 454/75, 229, 258, 256

[56] References Cited

U.S. PATENT DOCUMENTS

| | | | |
|---|---|---|---|
| 5,331,825 | 7/1994 | Kim | 236/51 X |
| 5,333,784 | 8/1994 | Pompei | 236/91 C |
| 5,772,326 | 6/1998 | Batko et al. | 236/51 X |
| 6,021,956 | 2/2000 | Haraguchi | 236/49.3 X |

*Primary Examiner*—Harry B. Tanner
*Attorney, Agent, or Firm*—Mayer, Brown & Platt; Robert J. Depke

[57] ABSTRACT

A device and method for controlling the interior temperature in the passenger compartment of a motor vehicle, in which the actual interior temperature detected by a radiation sensor is fed to a control loop which sets the interior temperature as a function of the measured temperature and a prescribed temperature. In an arrangement for controlling the interior temperature in which the noise disturbance from the fan motor is eliminated and reliable control of the interior temperature is ensured nonetheless, the radiation sensor is arranged on a printed circuit board which carries the control loop, such that a sensitive surface of the radiation sensor detects the thermal radiation which impinges on an outer surface, facing the vehicle interior, of a housing enclosing the printed circuit board.

10 Claims, 3 Drawing Sheets

DEVICE AND METHOD FOR CONTROLLING THE INTERIOR TEMPERATURE OF A MOTOR VEHICLE

BACKGROUND OF THE INVENTION

1. Field of the Invention

The present invention relates generally to the field of automatic controls. More specifically, the present invention is directed to a device and method for controlling the interior temperature in the passenger compartment of a motor vehicle.

2. Description of the Related Art

In operating units for controlling air conditioners in motor vehicles, NTC or PTC elements are used to measure the interior temperature of the motor vehicle. In this case, a small, quietly running fan is used to suck in the inside air from the passenger compartment and to ventilate the interior temperature sensor with the sucked-in air. This fan motor runs as soon as, for example, an opening signal of the central locking system, the interior light or the auxiliary heating is activated and this is detected by the air conditioner control unit. That is to say, the fan in the motor is already running before the ignition is switched on, or still runs on a while after the ignition has been switched off in order to cool the interior temperature sensor. The noise disturbance occurring in this case from the fan motor is felt to be troublesome by the vehicle user.

U.S. Pat. No. 5,333,784 discloses a radiation sensor for use in air conditioners of a motor vehicle. In the case of this device, the electric signal corresponding to the temperature of the measured object and emitted by the radiation sensor is fed to a microprocessor which sets the desired temperature of a device. This is performed by driving a heating system or a fan.

It is an object of the present invention to specify a device and method for controlling the interior temperature in the passenger compartment of a motor vehicle, in which the noise disturbance from the fan motor is eliminated and reliable control of the interior temperature control is ensured nonetheless. Other objects and advantages of the present invention will be apparent from the following summary and detailed description of the preferred embodiments.

SUMMARY OF THE INVENTION

According to the invention, a radiation sensor is arranged on a printed circuit board which carries the control loop, such that a sensitive surface of the radiation sensor detects the thermal radiation which impinges on an outer surface facing the vehicle interior of a housing enclosing the printed circuit board.

The advantage of the invention consists in that because of the arrangement of the radiation sensor in the vicinity of the outer surface of the operating part it is possible to dispense completely with the fan motor. In addition to the fan motor, the ventilation grating and ventilation stubs are also eliminated. The air distribution prevailing in the vehicle interior no longer needs to be led past on to the sensitive surface of the temperature sensor.

The radiation sensor is advantageously an infrared detector arranged in a sensor housing, the sensor housing being sealed by a radiation filter which is situated opposite the sensitive surface of the radiation sensor. The infrared filter, which serves the purpose of limiting the incident radiation to that region of the infrared spectrum for which the sensor has a maximum of sensitivity, thus focuses the incident radiation.

Arranged in a sensor housing as a sensitive surface is a thermopile element to which a temperature reference element is assigned, the electric signals generated by the thermopile element and the temperature reference element are connected to the control loop via an electronic amplifier arranged on the printed circuit board. In the case of the use of a microprocessor as evaluation circuit, both the sensor signal and the reference element signal are evaluated thereby. The microcomputer accomplishes a digital compensation of the temperature signal. In this arrangement, both the sensor and the evaluation circuit are separated from one another but both are on the same printed circuit board.

The thermal radiation impinging on the outer surface of the housing enclosing the printed circuit board is detected via a radiation filter integrated in the outer surface, and is relayed to the sensitive surface of the radiation sensor.

Depending on the filter material, there is, on the one hand, the possibility that the sensor housing projects beyond the edge of the printed circuit board in the direction of the outer surface of the housing enclosing the printed circuit board, and the infrared filter of the radiation sensor is integrated in the outer surface of the housing for the purpose of picking up the radiation impinging from the vehicle interior.

Since the outer surface of present-day operating units consists of plastic in the case of vehicle air conditioners, it is also possible for the radiation filter, likewise consisting of plastic, to be constructed in one piece with the outer surface of the housing enclosing the printed circuit board.

In a development, the sensor housing is arranged on the printed circuit board in such a way that the infrared filter of the radiation sensor runs approximately parallel to the surface of the printed circuit board, there being integrated in the outer surface of the housing enclosing the printed circuit board a second infrared filter which leads the thermal radiation impinging on the outer surface on to the infrared filter of the radiation sensor via a thermal radiation deflecting device arranged in the housing enclosing the printed circuit board. This arrangement is always advantageous when the sensor cannot be fitted directly at the measuring site. Because of the mirror optics used as radiation deflecting device, the thermal radiation passing through the second infrared filter is guided directly to the opening of the infrared sensor. In the case of this arrangement, it is also possible to dispense with the use of the fan motor, since the radiation is conveyed to the sensor by optical means.

So as to require as little room and assembly space for the mirror optics as possible, the thermal radiation deflecting device is fastened on the housing enclosing the printed circuit board. Depending on the preset spatial dimensions of the unit, the mirror optics is arranged on the outer surface of the operating unit or on the cover, directed toward the interior, of the operating unit.

It is particularly advantageous when the control device simultaneously undertakes the entire control of the heating, ventilation and air conditioning of the motor vehicle.

A plurality of the radiation sensors described are arranged on the printed circuit board in order to scan different regions of the passenger compartment for different temperatures.

The invention permits numerous design possibilities. One of them is to be explained in more detail with the aid of the figure represented in the drawing, in which:

DETAILED DESCRIPTION OF THE PREFERRED EMBODIMENTS

Figure 1:
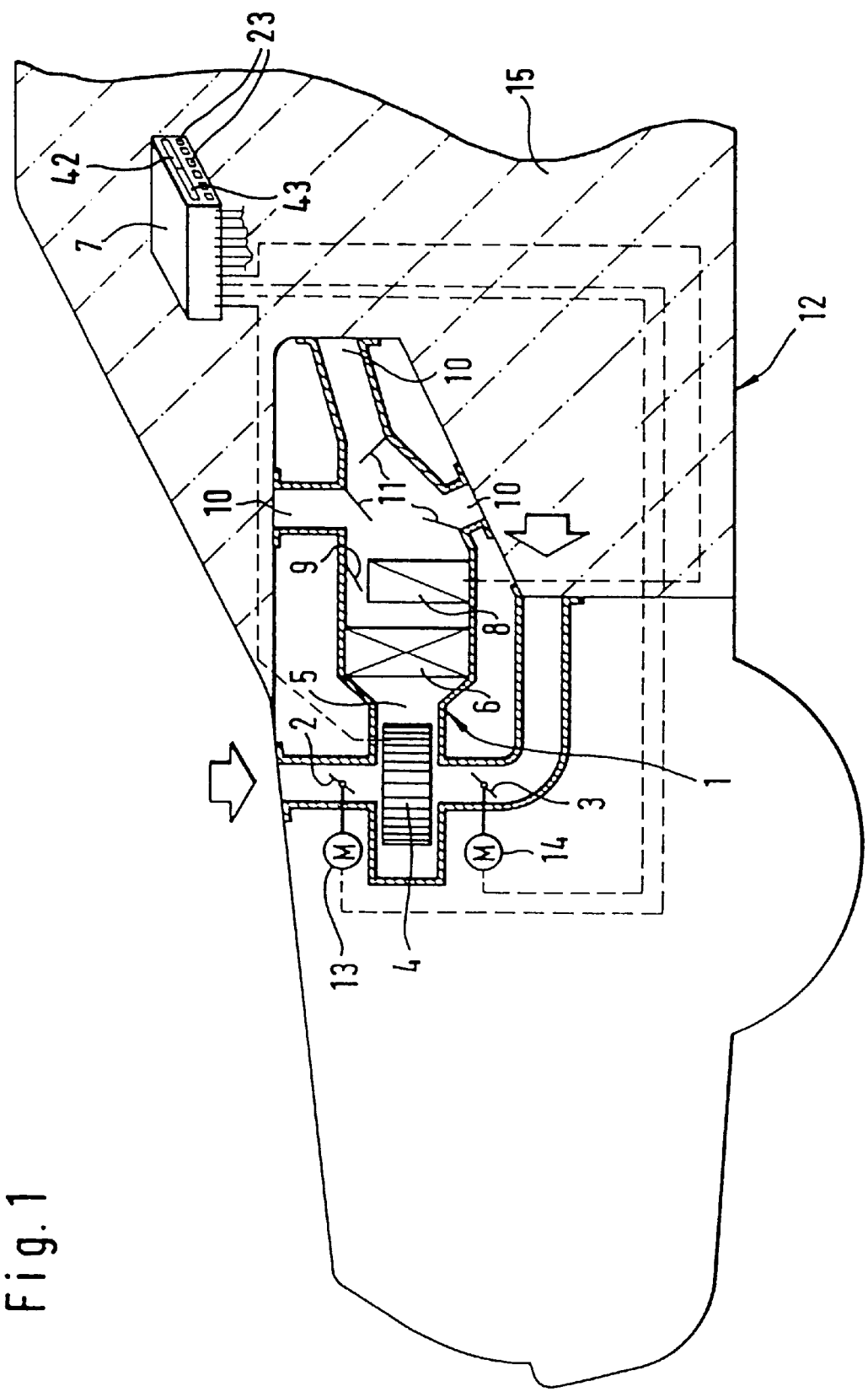
FIG. 1 illustrates an air conditioner of a motor vehicle.

Identical features are marked with identical reference symbols. The air conditioner 1 of a motor vehicle 12 is represented in FIG. 1 in its specific arrangement in the motor vehicle.

Fresh air from the surroundings of the motor vehicle is sucked into the motor vehicle 12 via the fresh air flap 2, whose position is controlled by a servomotor 13 as a function of electric signals which are emitted by the air conditioner control unit 7.

The circulating air from the passenger compartment of the motor vehicle is sucked in by the air conditioner 1 via the circulating air flap 3. The position of the circulating air flap 3 is also controlled via a servomotor 14 as a function of electric signals of the air conditioner control unit 7. Circulating and fresh air are conveyed into the air conditioner 1 via the fan 4, whose speed is set by the air conditioner control unit 7, the result being to produce mixed air 5 downstream of the fan 4. This mixed air 5 is fed to the evaporator 6.

In the cooling mode, the mixed air 5 is output to the passenger compartment 15 via outlets 10. These outlets 10 are arranged in ducts which point in the direction of the windshield, in the direction of the driver and/or front passenger and in the direction of the footwell of the driver and/or front passenger. Inlet of air can be controlled by the driver and/or front passenger by means of the air distributor flaps 11 arranged in the individual ducts.

A heat exchanger 8 is connected to the evaporator 6. The quantity of air output by the evaporator 6 is guided past the heat exchanger 8 with the aid of a temperature flap 9 and heated in the process. In the heating mode, the correspondingly temperature-stabilized mixed air then flows into the passenger compartment 15.

The air conditioner control unit 7 is usually arranged in or in the vicinity of the dashboard of the vehicle 12, with the result that there is no problem for the driver and front passenger to operate it during the journey.

Figure 2:
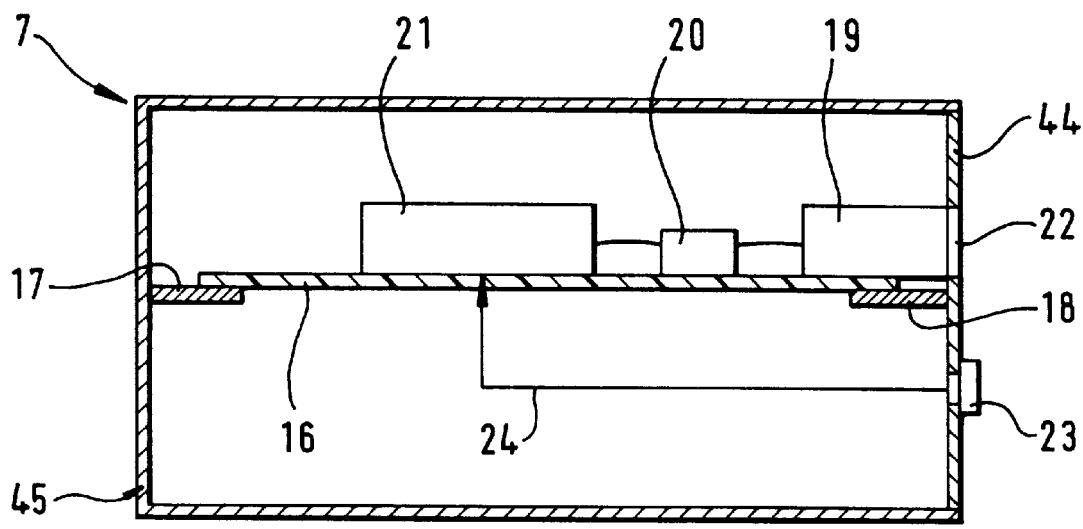
FIG. 2 illustrates a first embodiment of the arrangement according to the invention.

The diagrammatic design of the air conditioner control unit is represented in FIG. 2. Fastened to the holders 17 and 18 in a housing 45 is a printed circuit board 16 on which an infrared sensor 19, an amplifier arrangement 20 and a microprocessor 21 are arranged. The infrared sensor 19 is electrically connected to the amplifier circuit 20 which, in turn, leads to the microprocessor 21.

Recessed into an opening (not represented in more detail) on the front plate 44 of the housing 45 is a first infrared filter 22 which forms the termination of a sensor housing in which the infrared sensor 19 is arranged. Also arranged on the front plate 44 are operating elements 23 with which the driver and/or the front passenger can input their desired temperature. When an operating element 23 is actuated, an electric signal is sent to the microprocessor 21 via the electric line 24. The interior temperature desired by the vehicle occupant is evaluated by the microprocessor 21 as setpoint selection.

In the present case of the control of the interior temperature, the infrared filter 22 detects the thermal radiation impinging on the front plate 44 of the air conditioner unit 7, and the filtered constituent of the thermal radiation is evaluated by the infrared sensor 19. The sensor signal corresponding to the current interior temperature is amplified by the amplifier 20 and fed to the microprocessor 21 as a signal.

The microprocessor compares the setpoint with the temperature actually input and, as a function of the difference between the two values, drives the devices, represented in FIG. 1, of fan 4, heat exchanger 8 and/or the circulating air and fresh air flaps 2 and 3, in order in this way to set a temperature which is desired by the vehicle occupant.

Figure 3:
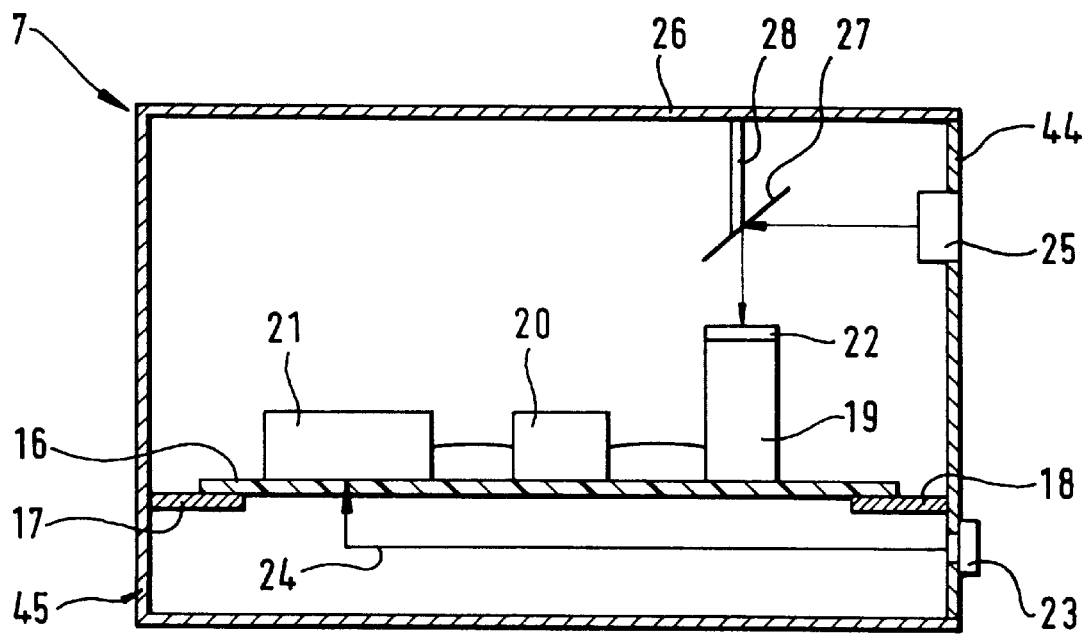
FIG. 3 illustrates a second embodiment of the arrangement according to the invention.

A further design of the solution according to the invention is represented in FIG. 3. It differs from the arrangement in FIG. 2 in that the sensor element 19 is arranged with its infrared filter 22 on the printed circuit board 16 such that the infrared filter 22 runs parallel to the surface of the printed circuit board 16. Recessed into the front plate 44 is a second infrared filter 25, which focuses the impinging thermal radiation operationally. A mirror optics 27 is arranged via a holder 28 on the cover 26 of the air conditioner control unit 7. This mirror optics 27 defects the radiation passed through the infrared filter 25, and directs it on to the infrared filter 22 of the radiation sensor 19. This arrangement is particularly favorable when, because of the spatial conditions of the air conditioner control unit 7, the sensor 19 cannot be recessed directly into the front plate 44.

The infrared filters 22, 25 consist of materials with a high transmittance in the region of the infrared spectrum such as, for example, silicon or a polymer compound. In this case, customary wavelengths which are passed by the infrared filter lie in the region of 4 to 10 micrometers.

In the case of the use of plastics, in particular, it is to be recommended to construct the front plate 44 and the infrared filter 22 (FIG. 2) and/or the infrared filter 25 (FIG. 3) in one piece. It is therefore directly a surface of the air conditioner control unit 7.

Figure 4:
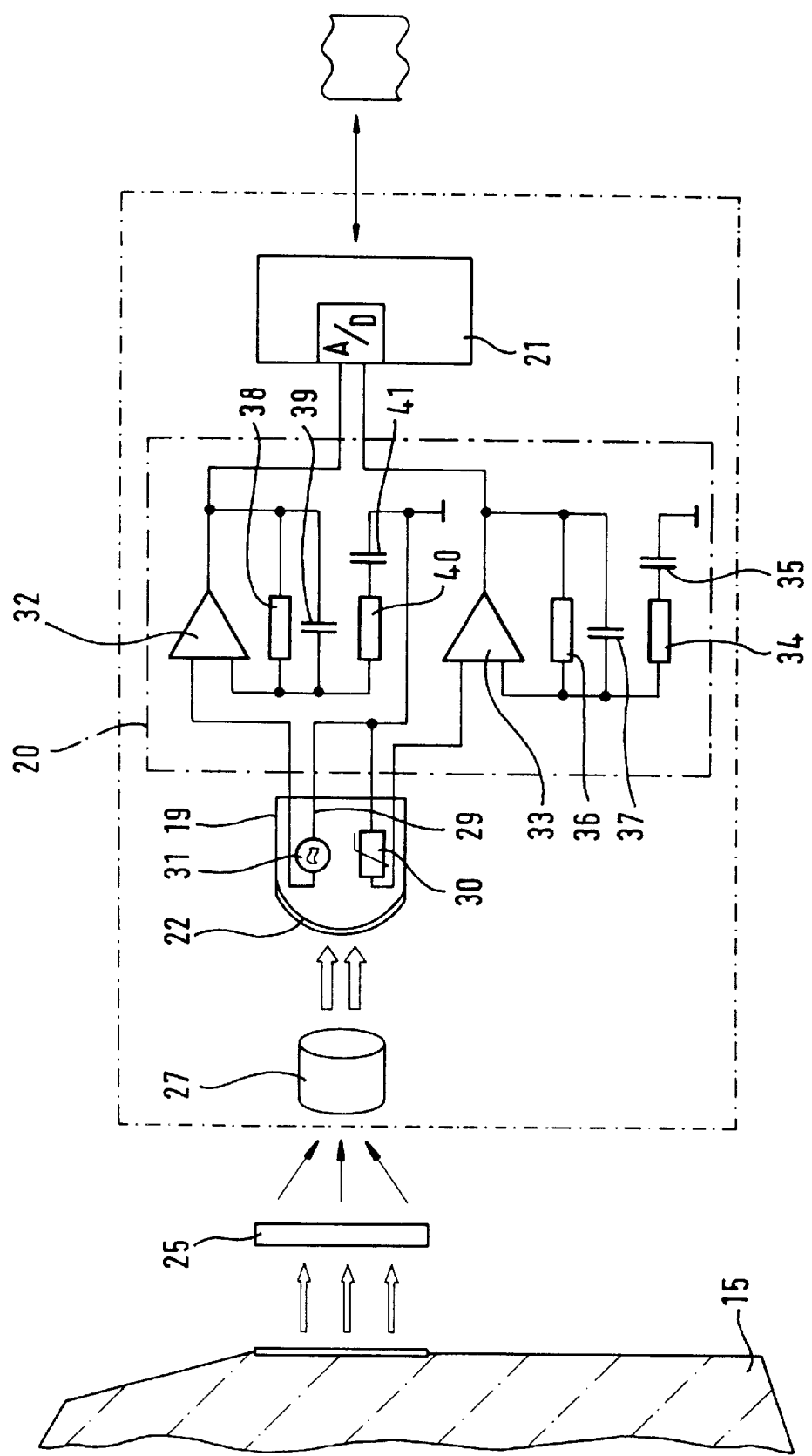
FIG. 4 illustrates a block diagram of the interior temperature control.

The electric circuit of the present invention is represented in FIG. 4. The thermal radiation emitted by the passenger compartment 15 is led via the infrared filter 25 and the mirror optics 27 on to the infrared sensor 19 which is sealed in the direction of radiation by the infrared filter 22. The infrared sensor 19 comprises a thermopile element 31 which forms the sensitive surface of the infrared sensor and determines the temperature. Arranged next to the thermopile element 31 is a reference element 30 which on the basis of its spatial proximity determines the reference temperature of the cold junction 29 of the thermopile element 31, and thus of the heat sink. The adjoining amplifier circuit 20 in this case has two amplifier branches.

The sensor outputs of the thermopile element 31 are connected in this case on the one hand to frame and on the other hand to the operational amplifier 32, while a sensor output of the reference element 30 is connected to the cold junction 29 of the thermopile element 31, which leads to frame. The second terminal of the reference element 30 is connected to a second operational amplifier 33. The operational amplifier 32 is connected to the microprocessor 21 via a network circuit comprising the resistors 38 and 40 and the capacitors 39 and 41. The output of the operational amplifier 33, which is fed back via a network comprising the capacitors 37 and 35 and the resistors 34 and 36, likewise leads to the A/D converter input of the microprocessor 21. Digital compensation of the temperature signal is performed by means of the microprocessor 21. As already described, the microprocessor 21 controls an actuator, for example a heating valve or the mixed air flap, as a function of a comparison of the measured inside temperature with the desired interior temperature.

As may be seen from FIG. 1, the detection of the temperature in the passenger compartment 15 can likewise be performed in a multizone mode. For this purpose, the infrared filter 25 has a plurality of regions 42, 43 which are at an angle to one another and measure the temperature in the driver's region, on the one hand, and in the front passenger's region, on the other hand. The subjective feeling of warmth of the occupants in the passenger compartment 15 can therefore be determined and set separately for each person. The reaction, resulting therefrom, of the heating and air conditioner control unit 7 can lead both to a change in the overall region of the occupants, and to a change in the relevant regions of the individual occupants respectively.

The sensor and the evaluation and compensation circuits required are located directly on the printed circuit board of the air conditioner control unit, and are therefore an integral constituent of the entire control of heating, ventilation and air conditioning.

What is claimed is:

1. A method for controlling an interior temperature in a motor vehicle, comprising the steps of:

sensing an actual interior temperature with a radiation sensor and transmitting a signal representative of the internal temperature to a control device;

setting the interior temperature as a function of the measured temperature and a prescribed temperature; and wherein the interior temperature is sensed with at least one radiation sensor arranged on a printed circuit board which carries the control device such that a sensitive surface of the radiation sensor detects thermal radiation which impinges on an outer surface of a housing enclosing the printed circuit board.

2. The method as claimed in claim 1, wherein the radiation sensor is an infrared detector located in a sensor housing, which is sealed by an infrared radiation filter opposite the sensitive surface of the radiation sensor.

3. The method as claimed in claim 2, wherein the sensor housing is comprised of a thermopile element to which a temperature reference element is assigned, and further comprising a step of transmitting electric signals generated by the thermopile element and the temperature reference element to the control device through at least one electronic amplifier.

4. The method of claim 1, wherein the radiation filter is integrated in an outer surface of the housing.

5. The method of claim 1, wherein the sensor housing projects beyond an edge of the printed circuit board in a direction of the outer surface of the housing, and the infrared radiation filter of the radiation sensor is integrated in the outer surface of the housing.

6. The method of claim 5, wherein the infrared radiation filter of the radiation sensor is located within a wall of the housing.

7. The method of claim 1, wherein the infrared radiation filter of the radiation sensor runs substantially parallel to a surface of the printed circuit board, and further comprising a second infrared radiation filter which transmits thermal radiation impinging on the outer surface on to the infrared filter of the radiation sensor via a thermal radiation deflecting device.

8. The method of claim 7, wherein the thermal radiation deflecting device is located on the housing.

9. The method of claim 2, wherein a plurality of radiation sensors for detecting different regions of the passenger compartment are arranged on the printed circuit board.

10. The method of claim 1, wherein the control device regulates the entire control of heating, ventilation and air conditioning in the motor vehicle.

* * * * *